(12) United States Patent
Yuyama

(10) Patent No.: US 7,197,484 B1
(45) Date of Patent: Mar. 27, 2007

(54) ASSET MANAGEMENT ADVICE SYSTEM AND RECORDING MEDIUM CONTAINING PROGRAM OF THE SYSTEM

(75) Inventor: Sumio Yuyama, Kanagawa (JP)

(73) Assignee: Goldenchart Co., Ltd., Kanagawa (JP)

( * ) Notice: Subject to any disclaimer, the term of this patent is extended or adjusted under 35 U.S.C. 154(b) by 1188 days.

(21) Appl. No.: 09/630,834

(22) Filed: Aug. 2, 2000

(30) Foreign Application Priority Data

Oct. 26, 1999   (JP)   ............................ 11/303456

(51) Int. Cl.
*G06Q 40/00*   (2006.01)
*G06Q 99/00*   (2006.01)
*H04K 1/00*    (2006.01)
*H04L 9/00*    (2006.01)

(52) U.S. Cl. ................. 705/50; 705/35; 705/36 R; 705/36 T; 705/37; 705/56; 705/57; 705/59; 705/51; 705/52; 705/53; 705/54; 705/55; 705/58

(58) Field of Classification Search ............ 705/35–39, 705/40, 41, 42, 43, 50–59; 707/503; 706/62; 713/172

See application file for complete search history.

(56) References Cited

U.S. PATENT DOCUMENTS

| | | | | |
|---|---|---|---|---|
| 5,101,353 | A * | 3/1992 | Lupien et al. | 705/37 |
| 5,852,811 | A * | 12/1998 | Atkins | 705/36 |
| 5,950,176 | A * | 9/1999 | Keiser et al. | 705/36 R |
| 6,018,722 | A * | 1/2000 | Ray et al. | 705/36 |
| 6,021,397 | A * | 2/2000 | Jones et al. | 705/36 |
| 6,430,542 | B1 * | 8/2002 | Moran | 705/36 |
| 6,505,174 | B1 * | 1/2003 | Keiser et al. | 705/36 R |

FOREIGN PATENT DOCUMENTS

| | | | |
|---|---|---|---|
| GB | 2363081 A | * | 12/2001 |
| WO | WO 00/54191 | * | 9/2000 |
| WO | WO 01/14994 A2 | * | 3/2001 |

OTHER PUBLICATIONS

Online Trading Takes Off (US Banker, v 107, n 5, p. 81+, May 1997).*
The (virtual) trade (Lim, Paul J.; Money v1n1 (money.com Supplement) pp. 26-29+, Summer 1998).*

* cited by examiner

*Primary Examiner*—Andrew J. Fischer
*Assistant Examiner*—Cristina Owen Sherr
(74) *Attorney, Agent, or Firm*—Kenneth Watov; Watov & Kipnes, P.C.

(57) ABSTRACT

The present invention provides a net trade advice system in which not only data such as stock prices is presented, but also asset management advice can be obtained as if a user is served by a professional adviser at the window, and transactions can be made.

The present invention provides an asset management advice system that comprises a database storing purchase and sale signals relating to assets to be traded, which signals are calculated based on data such as stock prices, foreign exchange market prices and commodities-futures prices, the amount of remains (such as the amount of issuance of securities and the amount of existence of commodities), and the volume of business (such as trading volume and purchase and sale prices) of assets to be traded. A processing means that produces a suitable investment scenario when a user's property information (constraints such as user's preference with respect to asset management and capitals) is inputted from a user terminal, and refers to the purchase and sale signals to send management advice data based on the investment scenario to the user terminal, and performs an asset transaction in accordance with a response to the management advice data from the terminal.

30 Claims, 1 Drawing Sheet

ASSET MANAGEMENT ADVICE SYSTEM AND RECORDING MEDIUM CONTAINING PROGRAM OF THE SYSTEM

FIELD OF THE INVENTION

The present invention relates to a data processing system for asset management through the use of securities, foreign exchange, futures or the like, and in particular, to an art of net trade utilizing a data communications network such as the Internet.

BACKGROUND OF THE INVENTION

Under the recent development of the information industry, electronic commerce utilizing a data communications network such as the Internet has been brisk. Net trade through data communications has enabled us to make transactions from personal computers at home, including transactions of assets such as securities represented by stocks and bonds, foreign exchange, and commodities futures relating to noble metals, natural resources and agricultural products.

Such an existing asset management system utilizing net trade is only a data-presenting means providing materials for judgement, in which a trading agent such as a securities company manages data such as stock prices and trading volume to provide it in the form of charts, tables or the like to a user terminal, and the user refers to it to make judgements by himself and orders trading. It is predictable that with the prevalence of personal computers and data communications, nonprofessionals with a little knowledge will be able to make asset transactions such as stock investments easily at home. However, through the conventional data-presenting means only, nonprofessionals can not easily perform asset management.

SUMMARY OF THE INVENTION

The present invention provides a system in which a user can make transactions while receiving advice on asset management as if he is served by a professional adviser at the window, instead of providing the conventional means merely representing data. Specifically, the present invention provides an asset management advice system comprising a data base that stores purchase and sale signals relating to an asset to be traded and a data processing means that produces a suitable investment scenario (calling an investment judgement program) when user's property information (constraints such as user's preference with respect to asset management and funds) is input from a user terminal (such as a personal computer, cellular phone or game terminal) via a predetermined communication means, refers to the purchase and sale signals to send management advice data based on the investment scenario to the user terminal, and makes an asset transaction in accordance with a response to the management advice data from the user terminal. Alternatively, the present invention provides an asset management advice system comprising a communication means connected to a data base that stores purchase and sale signals relating to an asset to be traded and a data processing means that produces a suitable investment scenario when user's property information is input from a predetermined input means, refers to the purchase and sale signals to provide management advice data based on the investment scenario to the user, and makes an asset transaction in accordance with user's response to the management advice data. The former is a system in which a host on the side of an asset trading agent such as a securities company or an investment advisory company serves as the data processing means to make an asset transaction. The latter is a system in which a personal computer a user owns serves as the data processing means to make an asset transaction, while the data base is managed on the side of the agent.

The purchase and sale signals may be those that are calculated on the ground of data such as prices (such as stock prices, foreign exchange and commodities-futures prices), the amounts of remains (such as the amount of issuance of securities and the amount of existence of commodities) and the volume of business (such as trading volume and the amount of purchase and sale) of assets to be traded, and also optimized by a prescribed calculation expression for the data base. Further, quantitative data relating to assets to be traded and their sources (such as the source of issuance of securities and the source of supply of commodities) and qualitative data relating to assets to be traded and their sources can also be utilized as ground for the purchase and sale signals. Furthermore, quantitative macro information data in the locations of the sources and the regions of transactions of assets to be traded and qualitative macro information data in the locations of the sources and the regions of transactions of assets to be traded can also be utilized. The quantitative data corresponds, when the assets are, for example, securities such as stocks and bonds, to figures included in profit-and-loss statements, financial statements and the like of the issuing companies, and when the assets are noble metals, natural resources, agricultural products and the like, to figures of the amount of production, the amount of consumption and the like. The qualitative data corresponds, when the assets are, for example, securities, to information of the issuing companies comprising credit information such as the industries they belong, the stock markets on which their stocks are listed, the status of the over-the-counter registration, the grading by a grading institution, relations with a financial institution in business connections and the status of bills circulation, finance information such as securities planned to be newly issued, capital increase and stock divisions, information relating to the managers such as change of the managers and reshuffle of the executive establishments, management information such as reorganization of business, restructuring, a merger or joint venture with another company, a buyout of another company, an acquisition by another company or a tie-up with another company, and information relating to the management resources such as development and sales of new products or discovery of a new embodiment. The quantitative macro information data corresponds to economic statistics data such as the rate of economic growth, the rate of price increase and the unemployment rate, and the qualitative macro information data corresponds to the political situation and the social situation.

It is preferable that a data processing means in this system automatically collect data concerning purchase and sale signals relating to an asset recommended by an investment scenario and data constituting grounds for them to update a data base. Specifically, the update of the data base is preferably not started by a user with some switch but made by the data processing means automatically obtaining data from media such as a news agency and an exchange, so that user's load such as remembering to update the data base is lightened and the update can be made periodically, for example, one time a day unfailingly. As a result, management advice data referring to the up-to date purchase and sale signals can always be produced. Further, the automatic update system allows update in real time of that kind of data for which earlier update is required. Furthermore, the data processing means can be set to automatically collect data concerning purchase and sale signals relating to user's holding assets and data constituting grounds for them to update the data base.

The asset management advice system of the present invention also makes the data processing means produce a plurality of investment scenarios with different characteristics (calling a plurality of investment judgement programs) and produce management advice data based on one investment scenario of them in accordance with user's selection. Specifically, the range of selection can be widened and it becomes possible to select an investment scenario characterized in a high-risk, high-return type or to select an investment scenario characterized in a risk-avoiding type according to circumstances. In this case, it is preferred that an animation character be set for each investment scenario and the character operates in accordance with management advice data to be an interface with a user. This instructs the management in an interactive manner as if the animation character is an advisor at the store and enables a nonprofessional asset manager to easily to handle it. The character recommends an asset to be traded in accordance with the management advice data, and the user receiving it makes purchase and sale. Alternatively, the character gives comments on an asset the user is going to purchase or sell in his judgement. Further, according to circumstances, the user entrusts effecting a transaction to the character and the character reports the result of the transaction to the user. The user thus proceeds through the various steps of the transaction, receiving advice from the character. However, he does not always need to follow the advice.

Under this animation character scheme, the data processing means may store management performance records for a past prescribed period of each investment scenario and present the management performance records as well as the animation character to a user. This allows the user to monitor management performances for e.g. the past ten years of each character to objectively judge the characteristics of the character.

In the case where such a plurality of investment scenarios are produced, it is preferred to set the data processing means to automatically collect data concerning purchase and sale signals relating to an asset recommended in accordance with the characteristics of each investment scenario and data constituting grounds for them to update the data base.

It is preferable that the user can select either the real mode in which to access the market to actually perform an asset transaction made by the data processing means in accordance with a response from the user, or the virtual mode in which not to actually access the market to perform it virtually. In the real mode, it works as an actual net trade, whereby purchases and sales are actually ordered, and real profits and losses occur. In the virtual mode, there is no actual order, and no real or actual profits and loss occur. In brief, in the virtual mode, it works as a kind of simulation (game).

The present invention also provides, in the form of a computer program incorporating the steps for the above-described system, a recording medium for recording an asset management advice program that makes a data processing unit perform a scenario producing process for producing an suitable investment scenario based upon inputted user's property information, a management advising process of producing management advice data based on the investment scenario, referring to purchase and sale signals relating to an asset to be traded stored in a data base, and a trading process for performing an asset transaction in accordance with user's response to the management advice data. The asset management advice program can further include a process in which the data processing unit automatically collects data concerning purchase and sale signals relating to an asset recommended by an investment scenario and data constituting grounds for them to update the data base. In addition, a process of automatically collecting data concerning purchase and sale signals relating to a user's holding assets and data constituting grounds for them to update the data base may further be added.

In the scenario producing process, it is preferred to produce a plurality of investment scenarios with different characteristics to permit a user to select one of the investment scenarios. It is preferable to set an animation character for each investment scenario so that the character can operate in accordance with management advice data to be an interface with the user in the management advising process. In this case, it is further possible to include a process of storing management performance records for a past prescribed period of each investment scenario, and to present the management performance records as well as the animation character to the user in the management advising process. In this case of producing a plurality of investment scenarios, it is preferable to include a process of automatically collecting data concerning purchase and sale signals relating to an asset recommended according to the characteristics of each investment scenario and data constituting grounds for them to update the data base.

In the trading process of the asset management advice program, it is also possible for a user to select either the real mode in which to access the market to make real transactions, actually or the virtual mode in which transactions are made virtually, without accessing the market to avoid real transactions.

Other features and advantages of the invention will be more apparent from the following description in connection with the accompanying drawings.

BRIEF DESCRIPTION OF THE DRAWINGS

Various embodiments of the invention are described in detail below with reference to the accompanying drawings, in which like reference designations identify the same item, wherein.

DETAILED DESCRIPTION OF PREFERRED EMBODIMENTS

Figure 1:
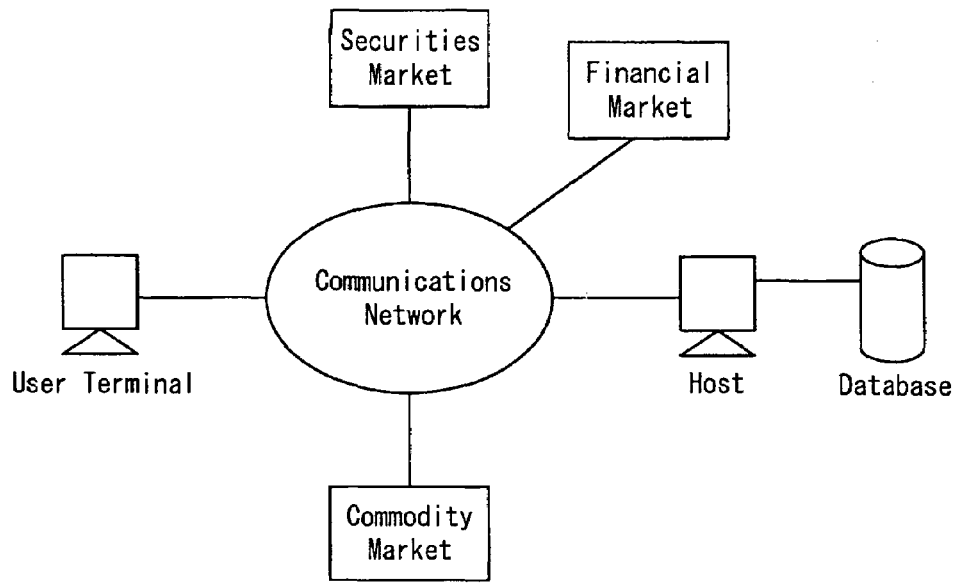
FIG. 1 is a block diagram showing an example of an asset management advice system of the present invention.

FIG. 1 shows an example of a structure in which a host computer 1 installed in the site of an asset trading agent, such as a securities company for operating or an investment advisory company as a data processing means of an asset management advice system for an embodiment of the invention.

A user terminal 3 provided by a personal computer (or a cellular phone) the user owns can be used to communicate with a host 1 of an asset trading agent such as a securities company or an investment advisory company from a dial-up adapter (a modem, for example) or a LAN adapter via a communications network 5 such as the Internet. Databanks of the securities market 9, financial market 11 and commodity market 13 are also connected to the communications network 5, from which banks necessary information can be retrieved. Further, data banks of news agents, newspaper publishing companies and magazine publishing companies (not shown in the figure) are also connected to the network 5 so that the user can access each kind of data such as the trends of the markets or the movement of the other markets.

The host 1 of an asset trading agent such as a securities company or an investment advisory company has a database 7 storing purchase and sale signals that comprise quantitative and qualitative data relating to prices, the amounts of issuance/existence, the volumes of trading/purchase and sale and the sources of issuance/supply of securities and commodities constituting assets to be traded, quantitative and qualitative macro information data in the locations and the regions of transactions of the assets and data consisting of the above prescribed algorithm. The host accesses each associated databank prescribed calculation expression. The host accesses each at least once per business day on a daily basis to collect information, and automatically performs an update of the database 7. Further, with the update on a daily basis, data per week, month and year is also updated and managed. Real-time data for which earlier update is required is updated successively in real time (with a lag due to technical and systematical constraints as a matter of course).

The user operates the terminal 3 he owns to initially input his property information. The property information constitutes constraints such as user's preference with respect to asset management, capital and the like, including the initial amount of management assets, the amount of an inflow of periodic cash flow (for example, the amount of a reserve of new savings per month), the cash holding rate (the percentage of cash in the total amount of assets, at which percentage or more cash is always held) and the extent of distributed investment (for example, the maximum number of brands in which the user will invest in the case of stocks). The property information input by the user is passed from the user terminal 3 to the host 1 via the communications means. The host receives it and produces a suitable investment scenario according to the property information. Namely, the host boots an investment judgement program suitable for the user.

In the case of this example, several kinds of investment scenarios are produced, each having individual characteristics. For example, a certain investment scenario is characterized in attaching importance on good bargains of stocks and purchasing brands meeting momentum conditions among conspicuous bargain brands overall. Another investment scenario is characterized in attaching importance on the growth prospects of companies and purchasing brands meeting momentum conditions among stocks with high growth prospects in profit. Still another investment scenario is characterized in calculating the degree of popularity of stocks from objective figures and purchasing brands meeting momentum conditions among brands with high popularity. These characteristics are, however, not fixed and absolute. It is allowed for a user to change parameters within a certain range. For example, it is permissible to change to some extent how much to attach importance on good bargains or how much to attach importance on growth prospects or popularity in each investment scenario.

When these several kinds of investment scenarios with different characteristics are produced, the host 1 presents them in the form of animation characters set for their respective scenarios to the user terminal 3. For example, a character like a gentleman is assigned to one investment scenario, a character other than a human being is for another investment scenario, and a character like a career woman is for still another investment scenario, thereby to distinguish them from each other and show them up on the display of the user terminal. At the same time, the host 1 sends records of management performances for the past ten years of each character to the user terminal 3 to help him judge the characteristics objectively.

The user selects one character suitable for his preference among the characters shown on the terminal 3 and sends instructions to the host 1. On the selection of the investment scenario, the host 1 refers to purchase and sale signals in the data base to send management advice data to advise what kind of brands are suitable at present and whether the brands should be sold or purchased in accordance with the selected investment scenario to the user terminal 3. Further, purchase and sale signals constituting grounds for the management advice data and data constituting grounds for the calculation of the purchase and sale signals are also presented to the user terminal 3, if necessary at that time.

At the user terminal 3, a transaction is proceeded in an interactive manner in which the character of the selected investment scenario talks and operates in accordance with the management advice data to present a management guide such as a recommended brand and the user performs an operation accordingly. At that time, the host 1 operates, in accordance with user's selection, either in the real mode (connected to net trade) in which to access the terminal of the securities market, financial market or commodity market to actually send purchase and sale instructions, or in the virtual mode (released from net trade) in which no connection is made with the securities market, financial market or commodity market to limit processing inside the host 1. In the real mode, the host 1 sends profit and loss resulting from actual transactions to the user terminal 3 and informs them through the character. In the virtual mode, the host 1 simulates transaction situations inside the host 1 based on the transition in price or trading volume at that day, and provides the results to the user through the character. That is, virtual trade is performed realistically and asset management can be performed like a game accompanying no actual profit and loss.

Figure 2:
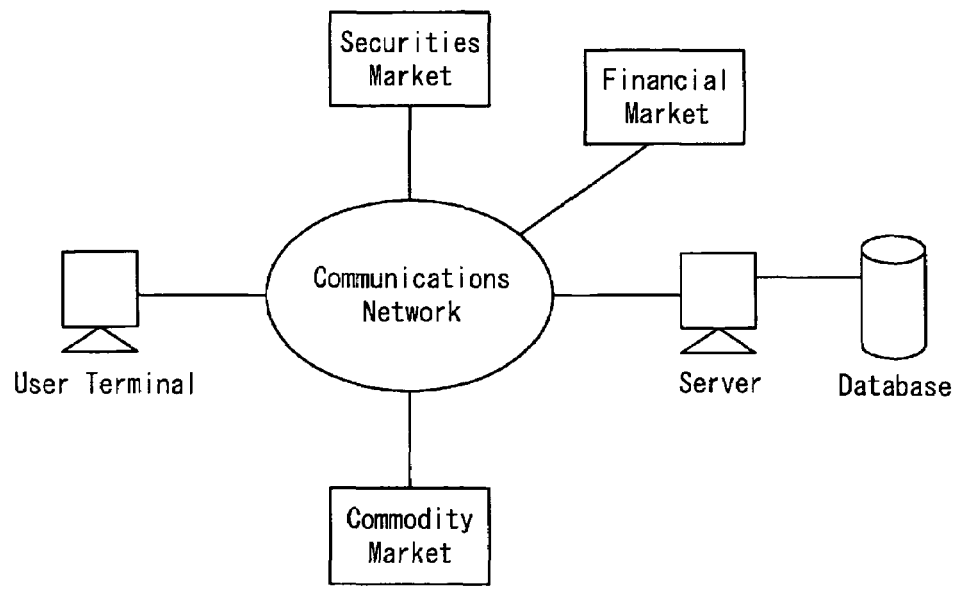
FIG. 2 is a block diagram showing another example of a asset management advice system of the present invention.

FIG. 2 shows an example of a structure in which a user terminal 3 a user owns serves as a data processing means of an asset management advice system. Namely, the user terminal 3 plays the same role as the host computer 1 in FIG. 1.

In this case, a server 15 equipped with a database 7 is installed on the side of an asset trading agent such as a securities company or an investment advisory company to manage the data base. Specifically, the server accesses the databanks of the securities market, financial market and commodity market to collect data that constitutes grounds for calculating purchase and sale signals to update the database, and also serves as the window for the user terminal 3 to access the database 7. The user terminal 3 performs the same functions as the host computer 1 shown in FIG. 1 except for accessing the database 7 of the asset trading agent such as a securities company or an investment advisory company through the server.

In accordance with the present invention, asset management advice is provided in accordance with the user's preferences and/or criteria, relative to data and other materials obtained for permitting the present system to analyze the same for determining the aforesaid advice. This enables the user to utilize net trade as an asset management means more readily than before. Further, the virtual mode allows the user to simulate and experience a realistic asset transaction, Prior to making an actual net trade.

Although various embodiments of the invention have been shown and described, they are not meant to be limiting. Those of skill in the art may recognize certain modifications to these embodiments, which modifications are meant to be covered by the spirit and scope of the appended claims.

What is claimed is:

1. An asset management advice system comprising:
    a database storing purchase and sale signals relating to assets to be traded in a market; and
    a data processing means for both producing a suitable investment scenario when a user's property information relative to assets for which a purchase or sale is to be determined is input from a user terminal via a prescribed communication mechanism, referring to the purchase and sale signals to send management advice data based on the investment scenario to the user terminal, the advice being to purchase or sell at least one asset, and said system performing an asset transaction in accordance with the user's communicated decision to purchase or sell, wherein, the user can select either a real mode in which the system responds to the user's decision by accessing the market to perform real time actual asset transactions via the data processing means, or a virtual mode in which the transactions are performed virtually by said data processing means without making an actual asset transaction in the market, and the results are tracked using actual market results as if an actual transaction had been made in the market.

2. An asset management advice system according to claim 1 wherein, data relating to prices, the amount of remains and the volume of trading of assets to be traded is utilized as parameters for the purchase and sale signals.

3. An asset management advice system according to claim 2 wherein, quantitative data relating to assets to be traded and their sources is also utilized as parameters for the purchase and sale signals.

4. An asset management advice system according to claim 2 wherein, qualitative data relating to assets to be traded and their sources is also utilized as parameters for the purchase and sale signals.

5. An asset management advice system according to claim 2 wherein, quantitative macro information data in the locations of sources and transaction regions of assets to be traded is also utilized as parameters for the purchase and sale signals.

6. An asset management advice system according to claim 2 wherein, qualitative macro information data in the locations of sources and transaction regions of assets to be traded is also utilized as parameters for the purchase and sale signals.

7. An asset management advice system according to claim 1 wherein, the data processing means automatically collects data concerning the purchase and sale signals relating to an asset recommended by the investment scenario and data constituting parameters for them to update the database.

8. An asset management advice system according to claim 1 wherein, the data processing means produces a plurality of investment scenarios with different characteristics and produces management advice data based on one investment scenario of them in accordance with the user's selection.

9. An asset management advice system according to claim 8 wherein, an animation character is set for each investment scenario and the character operates in accordance with the management advice data, to be an interface with the user.

10. An asset management advice system according to claim 9 wherein, the data processing means stores management performance records for a past prescribed period of each investment scenario and the management performance records together with the animation character are presented to the user.

11. An asset management advice system according to claim 8 wherein, the data processing means automatically collects data concerning the purchase and sale signals relating to an asset recommended in accordance with the characteristics of each scenario and data constituting parameters for them to update the database.

12. An asset management advice system according to claim 1 wherein, the data processing means automatically collects data concerning the purchase and sale signals relating to user's holding assets and data constituting parameters for them to update the database.

13. An asset management advice system comprising:
    a communication means for connection to a database storing purchase and sale signals relating to assets to be traded in a market;
    a data processing means for producing a suitable investment scenario when a user's property information is inputted from a prescribed input means, referring to the purchase and sale signals to provide management advice data based on the investment scenario to the user, the advice being to purchase or sell at least one asset, and selectively performing an actual or virtual asset transaction in accordance with the user's response to the management advice data;
    the data processing means further producing a plurality of investment scenarios with different characteristics, and management advice data based on one of said investment scenarios selected by the user; and
    an animation character being set for each investment scenario, the character operates in accordance with the management advice data, to be an interface with the user.

14. An asset management advice system according to claim 13 wherein, data relating to prices, the amount of remains and the volume of trading of assets to be traded is utilized as parameters for the purchase and sale signals.

15. An asset management advice system according to claim 14 wherein, quantitative data relating to assets to be traded and their sources is also utilized as parameters for the purchase and sale signals.

16. An asset management advice system according to claim 14 wherein, qualitative data relating to assets to be traded and their sources is also utilized as parameters for the purchase and sale signals.

17. An asset management advice system according to claim 14 wherein, quantitative macro information data in the locations of sources and transaction regions of assets to be traded is also utilized as parameters for the purchase and sale signals.

18. An asset management advice system according to claim 14 wherein, qualitative macro information data in the locations of sources and transaction regions of assets to be traded is also utilized as parameters for the purchase and sale signals.

19. An asset management advice system according to claim 13 wherein, the data processing means automatically collects data concerning the purchase and sale signals relating to an asset recommended by the investment scenario and data constituting parameters for them to update the database.

20. An asset management advice system according to claim 13 wherein, the data processing means stores management performance records for a past prescribed period of each investment scenario, and the management performance records together with the animation character are presented to the user.

21. An asset management advice system according to claim 13 wherein, the data processing means automatically collects data concerning the purchase and sale signals relating to an asset recommended in accordance with the characteristics of each scenario, and data constituting parameters for them to update the database.

22. An asset management advice system according to claim 13 wherein, the data processing means automatically collects data concerning the purchase and sale signals relating to the user's holding assets and data constituting parameters for them to update the database.

23. An asset management advice system according to claim 13 wherein, the user can select either a real mode in which to access the market to perform actual asset transactions made by the data processing means in real time, or a virtual mode in which the asset transaction are performed virtually and with no access to the market.

24. A recording medium recording an asset management advice program that makes a data processing unit perform steps comprising:
producing a suitable investment scenario in response to a user's property information provided as an input;
producing management advice data based on the investment scenario relative to purchase and sale signals relating to an asset to be traded, the advice being to purchase or sell at least one asset; and
performing an asset transaction in accordance with the user's communicated decision to purchase or sell, wherein the user can select either a real mode in which the system responds to the user's decision by accessing the market to make actual transactions, or a virtual mode to make transactions virtually using actual market values at the time without making an actual asset transaction, and the results are tracked using actual market results as if an actual transaction had been made in the market.

25. A recording medium according to claim 24 wherein, the asset management advice program further comprises a process in which a data processing unit automatically collects data concerning the purchase and sale signals relating to an asset recommended by the investment scenario and data constituting parameters for them to update the database.

26. A recording medium according to claim 24 wherein, in the scenario producing process a plurality of investment scenarios with different characteristics are produced, and the user selects one investment scenario therefrom.

27. A recording medium according to claim 26 wherein, in the scenario producing process an animation character is set for each investment scenario, and in the management advising process the character operates in accordance with the management advice data, for providing an interface with the user.

28. A recording medium according to claim 27 wherein, the asset management advice program further comprises a process of storing management performance records for a past prescribed period of each investment scenario, and in the management advising process the management performance records together with the animation character are presented to the user.

29. A recording medium according to claim 26 wherein, the asset management advice program further comprises a process of automatically collecting data concerning the purchase and sale signals relating to an asset recommended in accordance with the characteristics of each scenario, and data constituting parameters for them to update the database.

30. A recording medium according to claim 24 wherein, the asset management advice program further comprises a process of automatically collecting data concerning the purchase and sale signals relating to the user's holding assets and data constituting parameters for them to update the database.

* * * * *